No. 655,041. Patented July 31, 1900.
W. H. YOUNG & S. A. HAYES.
LIGHT ESPECIALLY ADAPTED FOR ELECTRIC HEADLIGHTS FOR LOCOMOTIVES.
(Application filed Mar. 14, 1900.)
(No Model.)
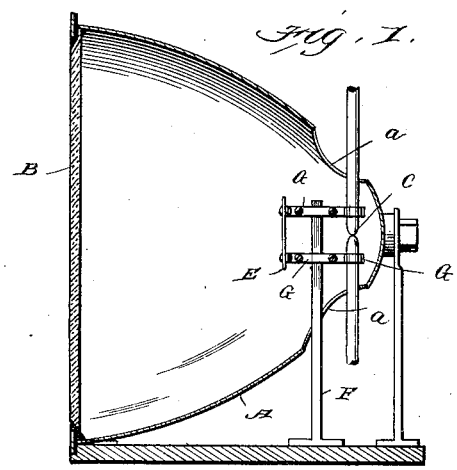
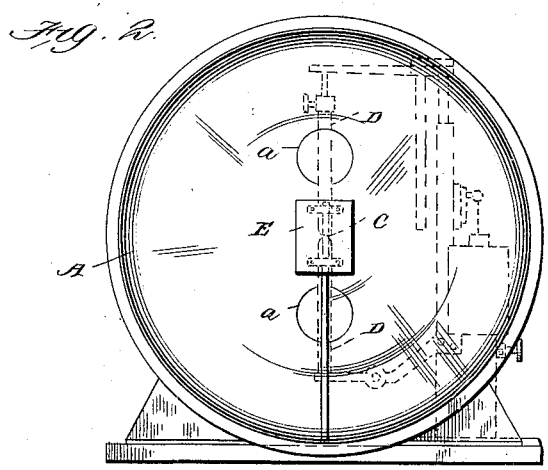
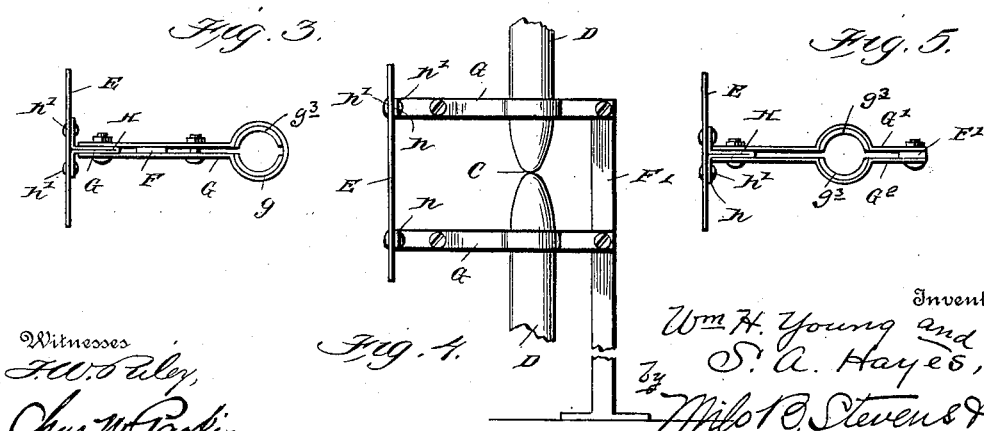

United States Patent Office.

WILLIAM HAROLD YOUNG AND STEPHEN A. HAYES, OF SANFORD, FLORIDA.

LIGHT ESPECIALLY ADAPTED FOR ELECTRIC HEADLIGHTS FOR LOCOMOTIVES.

SPECIFICATION forming part of Letters Patent No. 655,041, dated July 31, 1900.

Application filed March 14, 1900. Serial No. 8,578. (No model.)

*To all whom it may concern:*

Be it known that we, WILLIAM HAROLD YOUNG and STEPHEN A. HAYES, citizens of the United States, residing at Sanford, in the county of Orange and State of Florida, have invented certain new and useful Improvements in Lights Especially Adapted for Electric Headlights for Locomotives; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in lights, and has particular reference to and is especially adapted for an electric headlight for locomotives, search-lights, and other electric lights. It is well known that the extreme heat generated by the arc in an electric headlight, search-light, or the like is so intense on the inclosing glass or lens as to cause the same to break or crack when subjected to sudden cold or drafts.

It is the object of the present invention to provide a headlight with a protector which will prevent concentration of the heat of the light on the glass and which will not in any way interfere with the projection of a strong uninterrupted ray of light.

With such object in view the invention is embodied in a transparent or translucent body interposed between the source of light and the face glass or lens, which body interrupts the rays of heat and prevents the concentration thereof on the face glass or lens. It has been attempted to provide a non-breakable face-lens for a headlight, and mica has been used in place of glass in headlights; but this is impractical, owing to the cost of large and perfect pieces of mica sufficient for a lens for a headlight or the like, and so far as we are aware we are the first to interpose between the glass or lens proper and the source of light a transparent or translucent protector.

In the accompanying drawings we have shown a practical embodiment of the invention, but desire it understood that we do not limit the improvements in their useful applications to the particular construction which for the sake of illustration we have therein delineated.

In the drawings, Figure 1 is a vertical sectional view through the reflector of an arc electric headlight, showing our invention in elevation. Fig. 2 is a front elevation of the headlight shown in Fig. 1. Fig. 3 is an enlarged plan view showing the protector and holder therefor, and Fig. 4 is an elevation of a modified form of the holder for the protector.

Referring to the drawings, A indicates a reflector of a headlight, and B the front glass or lens therefor.

C indicates a source of light, which in the present instance is shown to be an arc-light, the carbons for which are shown at D D. These carbons are supported and fed by any suitable or preferred mechanism, and the same not forming a part of the present invention we do not deem it necessary to particularly describe or show this mechanism. The carbons are shown as entering the reflector through openings $a$ in the rear portion of the reflector A.

E indicates the protector, which, as will be seen from the drawings, is in the form of a thin plate or slab of transparent or translucent material suitable for the purpose—such, for instance, as mica, which, as shown by actual test, proves highly satisfactory. This plate of mica E is secured to and supported by a supporting device comprising an upright F, suitably supported, and which may, if necessary, be insulated, so as to prevent any interference with the electric currents to the arc. On the standard F are secured two horizontal forwardly and rearwardly extending arms G G. Each of these arms, as shown, is provided with a guide opening or socket for one of the carbons, said opening being indicated at $g$. $g^3$ indicates non-conducting lining-pieces in the opening $g$ to prevent short-circuiting. At the other end the arms both preferably are secured to the plate of mica in any preferred manner—such, for instance, as shown in the drawings, wherein a bent piece H is shown as secured by a screw, nut, or other suitable device to each arm G, the piece H having lugs or feet extending at right angles thereto, which lugs or feet $h$ are secured, as by rivets $h'$, to the mica plate.

It will be seen in the drawings, Fig. 4, that the arms G G are each composed of two separate pieces $G'$ and $G^2$, secured together and to the standard F at one end by a screw-nut or the like and at the other end secured together by a screw or nut connecting the arm with the piece H. The protector is carried by the arms and so located or positioned on the standard with reference to the source of light as to be directly in front of the same or between the source of light and glass or lens of the headlight in such position as to interrupt the rays of light proceeding from the source of light. It will be noted that the standard or upright F of the support is made of a thin strap or strip set edgewise with relation to the light, so as not to interfere with the proper projection of the rays.

In Fig. 4 we have shown a slightly-modified construction of the support for the protector, in which it will be seen that the upright or support (indicated at $F'$) is in the rear of or back of the source of light.

From this description it is believed that the purpose and use of the invention will be readily appreciated and understood.

Having thus described the invention, what we claim as new, and desire to secure by Letters Patent, is—

1. In a headlight or the like, the combination with a source of light, and a lens or glass, of a transparent or translucent body interposed between the source of light and the lens or glass and nearer to the source of light and adapted to protect the same from the heat of the light.

2. In a headlight or the like, the combination with a source of light and a glass or lens, of a disk or plate of mica interposed between the source of light and said glass, substantially as described.

3. In a headlight or the like, the combination of a reflector, a glass therefor, carbons extending into said reflector, a standard, arms secured to said standard and provided with guide-sockets for said carbons, and a transparent plate secured to said arms and interposed between said carbons and said glass or lens, substantially as described.

4. In an arc-headlight or the like, the combination of a reflector, a glass or lens therefor, carbons extending into said reflector, a standard or support extending into said reflector, two arms secured to said support or standard and projecting forwardly therefrom, a plate of mica secured to the forward ends of said arms, said arms being provided between said plate of mica and said standard with sockets for said carbons, substantially as described.

In testimony whereof we affix our signatures in presence of two witnesses.

WILLIAM HAROLD YOUNG.
STEPHEN A. HAYES.

Witnesses:
THOS. D. SINGLETARY,
CHARLES S. PARTRIDGE.